United States Patent
Fletcher et al.

[11] 3,712,120
[45] Jan. 23, 1973

[54] MULTI AXES VIBRATION FIXTURES

[76] Inventors: James C. Fletcher, Administrator of the National Aeronautics and Space Administration, with respect to an invention of; Clifton R. Sims; Richard C. Taylor, both of Huntsville, Ala.

[22] Filed: Dec. 28, 1971

[21] Appl. No.: 213,004

[52] U.S. Cl. .................................................73/71.6
[51] Int. Cl. ..............................................B06b 3/00
[58] Field of Search.......................................73/71.6

[56] References Cited

UNITED STATES PATENTS

| | | | |
|---|---|---|---|
| 2,306,110 | 12/1942 | Pendleton | 73/71.6 X |
| 3,043,135 | 7/1962 | Coulouriotes | 73/71.6 X |

*Primary Examiner*—James J. Gill
*Attorney*—L. D. Wofford, Jr. et al.

[57] ABSTRACT

The apparatus includes a shaker platform fixture having a mounting face upon which is supported a movable specimen mounting fixture. The specimen mounting fixture is pivotally movable relative to an axis perpendicular to the plane of the mounting face of the platform fixture and holds a specimen to be vibrated along its orthogonal axes. The mounting face of the platform fixture is provided with the necessary angle of incline relative to the plane of vibration, and the specimen mounting fixture is provided with mounting faces having the necessary angle of incline relative to the mounting faces of the platform fixture, such that turning of the specimen mounting fixture about its pivotal axis will expose the mounted specimen to vibration along each of its major orthogonal axes. A shaker platform is provided of a configuration having a mounting face of such angular incline to the plane of vibration so that the specimen to be vibrated may be attached directly to this face, and, in turning of the specimen along an axis perpendicular to said mounting face, subject the same to vibration along a number of other orthogonal axes.

8 Claims, 9 Drawing Figures

PATENTED JAN 23 1973
3,712,120
SHEET 1 OF 3
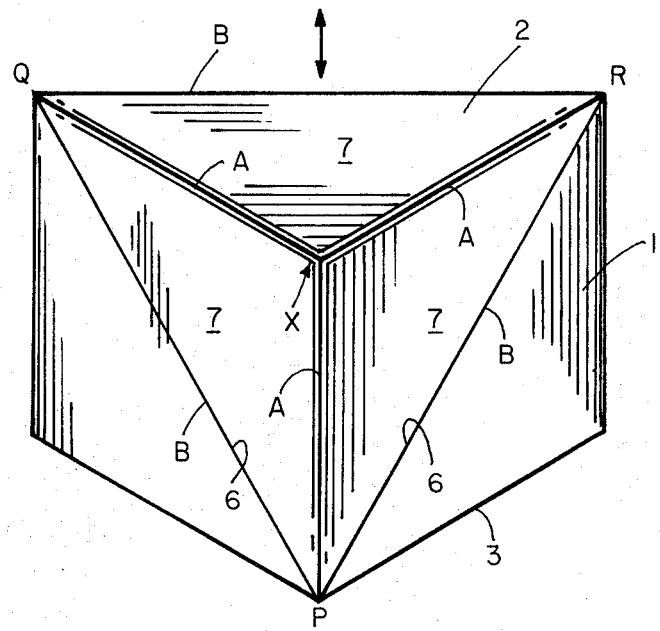
Fig. I
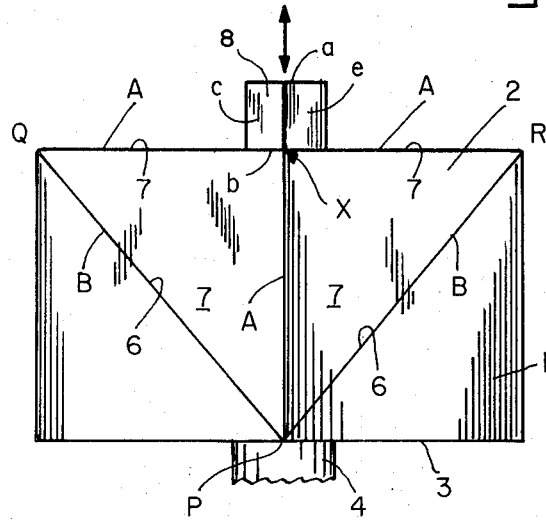
Fig. II
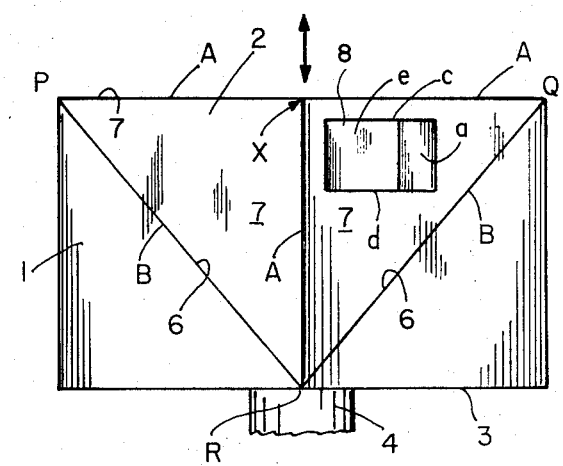
Fig. III
Clifton R. Sims
Richard C. Taylor  INVENTORS.
BY Wayland H. Riggins
ATTORNEY

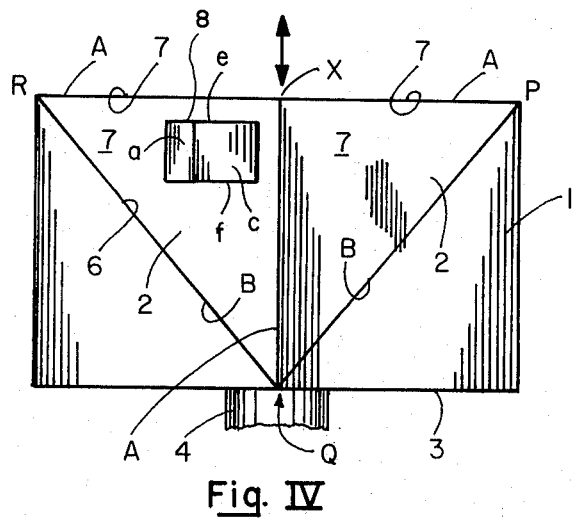
Fig. IV
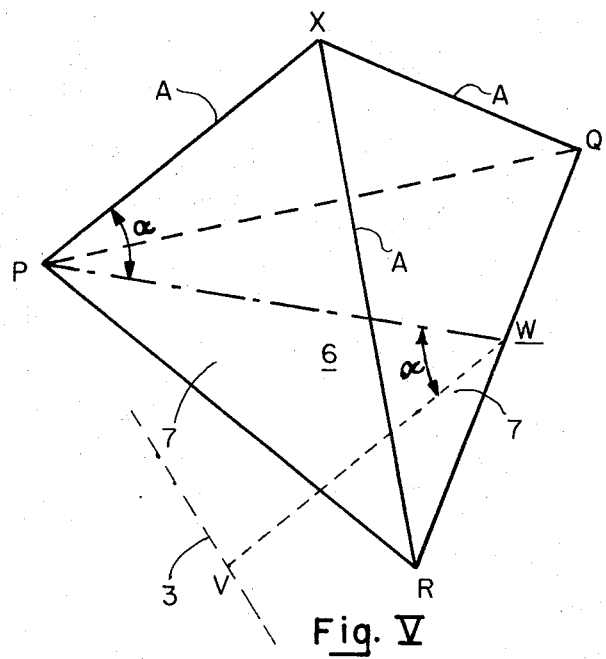
Fig. V
Clifton R. Sims
Richard C. Taylor  INVENTORS.
BY Wayland H. Riggins
ATTORNEY

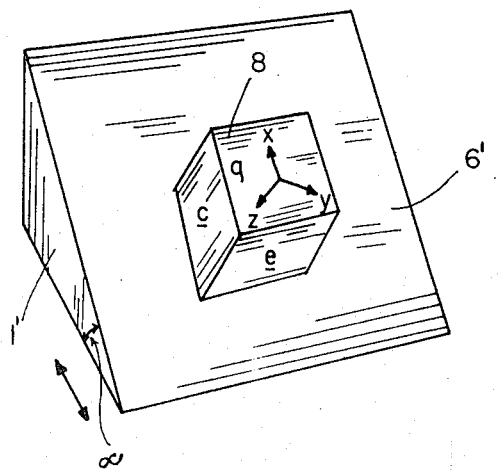
Fig. VI
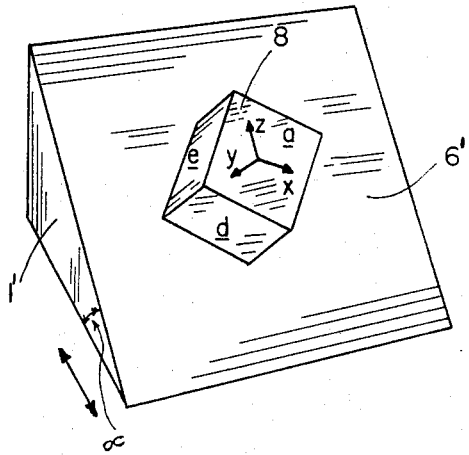
Fig. VII
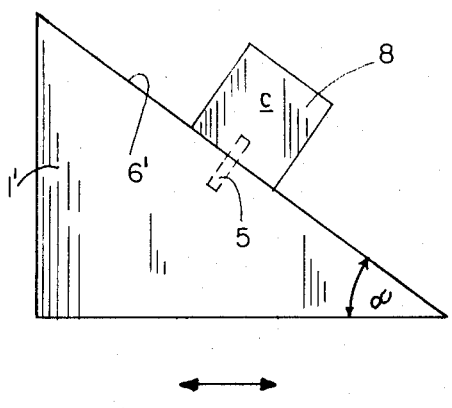
Fig. VIII
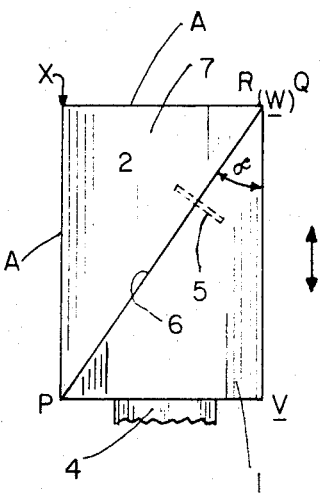
Fig. IX

MULTI AXES VIBRATION FIXTURES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2487).

BACKGROUND OF THE INVENTION

1. Field of the Invention

The invention relates to the testing of specimens, of various materials, to determine the effects of vibration, and the performance of vibration tests to meet certain prescribed standards. The effects of vibration in connection with the forces set up under the severe environmental conditions encountered by vehicles and instrumentation employed in space exploration is of primary importance. Particularly is one concerned with tests in all possible vibrational planes, or along as many orthogonal axes of a specimen as necessary to prove the strength of an item under the extraordinary conditions to which it will be subjected. The items to be tested are of such various sizes and shapes that it is desirable to have an apparatus which can be simply and quickly adapted to such usage. One which does not require too many structural modifications, (or complicated mounting and dismounting of the specimen), in the case of the larger items, is desirable in order that these tests may be performed with the minimum amount of effort. The present invention employs a simplified but efficient technique and apparatus design. Structural details are subject to many modifications, but the embodiment of the basic essential elements of the design disclosed will provide an apparatus with the desired flexibility to meet most sizes and shapes of specimens to be tested.

2. Discussion of Prior Art

There have been many attempts in the past to provide apparatus for making vibration tests along the orthogonal axes of test specimens. However, these attempts have been limited to, for the most part, devices which embody changing the plane of the platform supporting the object to be vibrated; or, in a more complicated manner, detaching the specimen under study from the vibration fixture and moving it into a different plane by means of complicated flanges and attaching apparatus.

Currently the method of performing vibration in three axes, along the orthogonals, being each of three mutually perpendicular axes, is as follows: The apparatus consists of a shaker and a movable plate element. The shaker is positioned vertically and the item mounted to a plate on top of the moving element. Instrumentation is installed and the test in the first axis is performed. The shaker is then positioned horizontally and its moving element connected to a "slip" plate which rides on an oiled granite block. A Team table is sometimes used to accomplish this. The item is mounted to this plate, instrumentation installed, and the test in the second axis is performed. To perform the test in the third axis, it is necessary to unfasten this item (or slip plate), rotate it 90° and reinstall. The instrumentation also must be changed. While, it is pointed out that not all vibration tests are performed in this manner, special requirements of the item, such as geometry, operative characteristics, etc, dictating a variation in the above, generally this procedure will result in the simplest and fewest interconnecting brackets. The disadvantages of this procedure are the connecting special brackets to be designed and fabricated, and the time required to perform the numerous physical changes in completing the tests.

Attention is called to U.S. Pat. No. 2,306,110, granted to Pendleton. This is typical of apparatus designed to determine the resonant frequency of apparently duplicate unit specimens along different axes of a specimen, and consists of an inclined support plate 21 mounted upon a frame with a quadrant adjustable to position the support at the desired incline. A means of vibration is supplied and the specimen is mounted by placing it upon the support plate, and, thereafter, vibrating the specimen at different angles until the vibration is sufficient to overcome the friction which holds the specimen on the plate. This would constitute the point of resonant frequency of the item being vibrated. It is obvious that the support plate may be inclined at different angles, although the specimen is not affixed to the support plate and this apparatus does not anticipate vibration above the point of maximum resonant frequency; but, even if the specimen were affixed to the support plate, such that it would not move, relative to said plate, the angles of vibration are limited to two orthogonals, and to achieve vibration in the third, the specimen must be detached from the support plate and turned; or the support plate itself would have to be turned into another plane of vibration.

In the instant invention we have overcome the problem of having to dismount and remount a specimen, as well as having achieved a means by which a specimen may be vibrated in all or most of its orthogonals in one mounting operation by providing a shaker platform fixture having a mounting face upon which is supported a movable specimen mounting fixture. The angle of the mounting face of the shaker platform fixture and the angle of the specimen mounting fixture are selected such that mere pivotal movement of the specimen mounting fixture on the mounting face around an axis perpendicular to that face will achieve a vibration along all of the orthogonal axes. This would be certain to achieve vibration along the major orthogonals, and a variation of the apparatus has been provided in the present invention whereby the specimen to be vibrated itself may be mounted on the mounting face and pivotally rotated along an axis perpendicular to said mounting face to achieve vibration along other orthogonal axes.

OBJECTS AND SUMMARY OF THE INVENTION

It is, therefore, a primary object of this invention to provide multi axes vibration fixtures which will be simple in design, and provide a technique whereby a specimen may be vibrated along its major and other orthogonal axes without the necessity of continuous mounting and dismounting of the specimen and changes in the plane of vibration of the basic platform providing the vibration means. A salient feature in connection therewith is the provision of a shaker platform having a fixed plane of vibration upon which is supported a movable specimen mounting fixture.

Another object of the invention is to provide apparatus of the character, aforesaid, wherein the plane of vibration along the major orthogonal may be achieved without complicated mounting and dismounting of the specimen, and wherein vibration along these axes may be achieved with the minimum amount of angular measurement to assure such vibration. An important feature in this connection is achieved by our invention by means of a movable specimen mounting fixture having mounting faces relative to the mounting face of the platform fixture, with critical predetermined angles for each fixture in order that a minimum measured angular movement will automatically bring an orthogonal vibration plane into effect. The angle of the mounting face of the shaker platform and the angle of the specimen mounting fixture are such that mere pivotal movement of the specimen mounting fixture on the mounting face around an axis perpendicular to that face will achieve a vibration along all of the major orthogonal axes. A further object is to provide apparatus wherein vibration along a number of other orthogonal axes may be achieved with the minimum amount of movement of the specimen and without the necessity of complicated flange attachments and mounting brackets as are now necessary. A feature in this connection provides for a shaker platform having a critical angle on its mounting face whereby simple pivotal rotation of the specimen around an axis perpendicular to said mounting face will achieve vibration along other orthogonal axes.

BRIEF DESCRIPTION OF THE DRAWINGS

FIG. I is an illustration, in perspective, of a shaker platform fixture having a mounting face upon which is supported a movable specimen mounting fixture in the form of an equilateral pyramid. The view is taken out of plane as looking at the apparatus along an axis taken from the apex of the pyramid perpendicular to the mounting face of the shaker platform fixture, in order to show that the sides of the pyramid are orthogonal at the apex.

FIG. II is an elevation view of the apparatus, as in FIG. I, with the base of the shaker platform fixture in a horizontal plane, showing the plane of vibration in a vertical direction, with a specimen diagrammatically illustrated as a cube mounted at the apex of the pyramid on one of its faces in a horizontal plane.

FIG. III is an elevation view of the apparatus, as in FIG. II, with the specimen mounting fixture having been turned through an angle of 120° around the axis from the apex of the equilateral pyramid perpendicular to the mounting face of the platform fixture, in a clockwise direction.

FIG. IV is an elevation view, as in FIG. II, with the specimen mounting fixture having been turned through a further angle of 120° around the axis from the apex of the equilateral pyramid perpendicular to the mounting face of the platform fixture, in a clockwise direction.

FIG. V is a diagrammatic illustration, using the equilateral pyramid of the mounting fixture, to determine the angle of inclination of the mounting face of the platform fixture relative to the plane of vibration of the apparatus.

FIG. VI is a modification of the invention, showing a wedge shaped shaker platform fixture having a mounting face at an angle permitting the attachment of the specimen to be vibrated directly to the mounting face of the platform fixture. In this view vibration is along a horizontal plane as indicated, vibrating one of the orthogonal axes of the specimen.

FIG. VII is another similar view of the platform fixture as shown in FIG. VI, wherein the specimen has been turned through an angle along one of its major orthogonal axes perpendicular to the face of the platform fixture, 120° in a clockwise direction.

FIG. VIII is a side view, in diagrammatic form, of the apparatus shown in FIGS. VI and VII to indicate the angle of the mounting face of the platform fixture relative to the plane of vibration.

FIG. IX is a side view in elevation of the apparatus shown in FIGS. I, II, III and IV, to indicate the angle of the mounting face of the platform fixture relative to the plane of vibration.

DETAILED DESCRIPTION OF THE INVENTION

Referring more particularly to the drawings, we have shown one embodiment of our multi axes vibration fixtures in FIGS. I, II, III and IV. With particular reference to FIGS. I and II, we have provided a shaker platform fixture 1 having pivotally mounted thereon a specimen mounting fixture 2. To the base 3 of the shaker platform fixture 1 there is affixed a shaker shaft 4 which, in this illustration, will provide vibration as indicated in a vertical plane by the arrows. The line of sight in FIG. I is along the pivotal axis 5 (FIG. IX) of the mounting fixture 2, said mounting fixture being an equilateral pyramid with the axis 5 extending from the apex of the pyramid perpendicular to the mounting face 6 of the platform fixture 1.

The equilateral pyramid forming the mounting fixture 2 has equal length legs A intersecting at right angles at the apex and therefore being orthogonal. The pyramid would also have equal base legs B providing mounting faces 7 as indicated.

Referring more particularly to FIG. II, we have mounted a specimen to be vibrated, in the form of a cube indicated by the reference numeral 8, having opposite faces a–b, c–d, e–f, as indicated near the apex of the pyramid mounting fixture. For the purpose of illustration in this embodiment, the specimen 8 is mounted such that its faces are oriented parallel to the leg A extending from the apex of the pyramid type mounting fixture.

In this embodiment, the apparatus as illustrated in FIG. I, is so constructed that the uppermost mounting face 7 of the mounting fixture 2 lies in a horizontal plane with the specimen mounted as indicated in FIG. II.

It can be seen that with this type of structure, vibration of the platform fixture 1 in a vertical plane, as in FIG. II, will result in vibration of the specimen 8 in a vertical plane through its opposing faces a–b, along one of its major orthogonal axes. Considering the points at the base intersections of the base legs B of the pyramidal fixture as designated by the reference characters P, Q and R, it will be observed that we now turn the mounting fixture through an angle of 120° about the axis from the apex of the pyramidal fixture perpendicular to the mounting face 6 of the platform fixture 1. This brings the specimen 8 into position, as shown in FIG. III, such that vibration in the vertical plane will result in vibration of the specimen 8 in a vertical plane through its opposing faces c-d, along another of its major orthogonal axes. Thusly, if we now turn the mounting fixture through another angle of 120° about the same pyramidal axis, it brings the specimen 8 into a position, as indicated in FIG. IV, such that vibration in a vertical plane will result in vibration of the specimen 8 in a vertical plane through its opposing faces e-f, along its third major orthogonal axis.

In order to obtain an apparatus of proper angular incline of the mounting face of the platform fixture to achieve vibration of the specimen along its orthogonals as the mounting fixture is turned through 120° as indicated, it is necessary to establish certain angular relations with regard to the structure.

First, we have selected an equilateral pyramid orthogonal as to its legs at the apex as the geometric form for such a mounting fixture. This is a proper form to orient a mounting face in a horizontal plane. Such placement of one face in a horizontal plane would orient each of the other mounting faces of the pyramid in a vertical plane because of the orthogonal legs.

Next, we must choose a mounting face for the platform fixture having an angle of inclination, relative to the plane of vibration, which will place the upper face of the mounting fixture in a horizontal plane as needed.

This can be done by trial and error, in elevation of such a pyramid on the vertex at the intersection of two of its base legs to place a face 7 in a horizontal plane. The angle subtended between a line from this vertex to the midpoint of the upper horizontal base line of the pyramid and a vertical line from said midpoint (assuming vertical vibration) would be the desired measured angle of incline of the platform fixture mounting face 6 relative to the plane of vibration. Of course, its complement can be used to measure the angle of incline of the face 6 from the horizontal plane.

Referring to FIGS. I, II and V, we can see another derivation of this angle. To achieve the angular structure of the apparatus shown in this embodiment we will now assume that the whole of FIG. I represents one-half of a perfect cube lying in a horizontal plane as in FIG. II. We halve the cube by cutting it in a vertical plane along one diagonal Q-R of its upper horizontal face. The specimen mounting fixture 2 and platform fixture 1 are formed by cutting the resultant half-cube by a plane passed coaxially through the diagonal Q-R and the point of the vertex P. We have the mounting fixture if we mount it pivotally along an axis from the apex of the resulting equilateral pyramid perpendicular to the base of the pyramid or mounting face 6. It will be apparent that this meets the conditions for our mounting fixture, which, when turned about an angle of 120° relative to the pivotal axis, will maintain the mounting faces 7 in either a horizontal or vertical plane.

Referring to FIG. V, the equilateral pyramid representing the mounting fixture is shown is perspective. The apex is designated by the character X, the vertex at the intersection of each of the legs A and base legs B by P, Q and R, respectively. The line P-W is drawn from the vertex P to the midpoint of the opposite base line Q-R. The line V-W is a line in the plane of vibration perpendicular to Q-R at W. Since the legs A are orthogonal at X, if the line P-X is vertical the line V-W is also vertical; and the angle alpha (or XPW) is equal to the angle PWV, which is the angle of incline the platform fixture mounting face 6 must have to the plane of vibration. See FIG. IX.

The angle alpha, in the embodiment of FIGS. I, II, III and IV, is automatically established by selecting as illustrative the half-cube structure, and it measures, to the closest possible determination, 35° 16′.

However, using the equilateral pyramid type mounting fixture, it can be seen that other shapes of shaker platform fixtures can be employed, calculating the angle alpha for the incline of the mounting face relative to the plane of vibration as indicated in the discussion of FIG. V. We take, for example, a wedge-shaped platform, as shown in FIGS. VI, VII and VIII. Here we choose for convenience a horizontal plane of vibration. We would, of course, orient a pyramidal mounting fixture with a base line parallel to the horizontal, making one of the mounting faces 7 of the fixture lie in a vertical plane. One of the orthogonal legs A of the mounting fixture would now be in the direction of vibration, in a horizontal plane. The angle alpha, as in FIG. V, would be the selected angle of incline of the wedge platform mounting face relative to the horizontal.

On the other hand, using a platform fixture 1′, as in FIGS. VI and VII and VIII, with the angle alpha determined as above, one can directly mount the specimen 8, pivotally on an axis along the major orthogonal through the center thereof perpendicular to the face 6′, on the platform fixture. So mounted, the specimen may be turned about its pivotal axis through angular increments of 120°, and thus be vibrated through three mutually perpendicular axes or orthogonals. It is noted that these axes are not the major axes of the specimen. Turning is indicated by x, y and z.

Proof of the angle alpha, (being the angle of the platform fixture mounting face relative to the plane of vibration) as being, under these conditions, 35° 16′, although here done by geometric measurement, can be done by matrix algebra solution of the trigonometric functions of a system of equations using a set of assumed orthogonals. These are equated to unity as a measure. We arrived at nine equations, and solving the simplest, came up with the value of 35° 16′ for the desired angle.

It can readily be seen that the multi axes vibration fixtures which we have invented are well suited to meet all of the objects hereinbefore set forth in this specification. We have provided fixtures and a technique whereby a specimen may be vibrated along its major and other orthogonal axes without the necessity of continuous mounting and dismounting of the specimen and changes in the plane of vibration of the basic platform providing the vibration means. By adoption of the equilateral pyramid as the form to be assumed by the sides and base of a movable specimen mounting fixture we have made it possible to determine a suitable angle for a shaker platform fixture mounting face relative to the plane of vibration. Using this angle with our mounting fixture we are able to merely turn our mounting fixture through increments of angles of 120° about its pivotal base to achieve vibration along all of the major orthogonals of a specimen mounted thereon.

It would be obvious that several specimens could be vibrated at the same time with the use of this fixture, by mounting these specimens on the several faces of the mounting fixture at the same time. Complicated mounting and dismounting of the specimens is thereby eliminated. We have also provided a platform fixture with a proper angle of inclination relative to the plane of vibration whereon a specimen may be directly mounted in a pivotal fashion, and turned about its pivotal mounting through increments of angles of 120° to achieve vibration along other orthogonal axes which are not the major axes of the specimen.

The invention has other advantages which are obvious and which are inherent to the structure.

It will be understood that certain features of any sub-combinations of the invention are of utility and may be employed without reference to other features and sub-combinations. This is contemplated by and is within the scope of the claims.

As many possible embodiments of the invention may be made without departing from the scope thereof, it is to be understood that all matters set forth or shown in the drawings is to be interpreted as illustrative and not in a limiting sense.

Having thus described our invention, what is claimed is:

1. Multi axes vibration apparatus for a test specimen comprising:
    a shaker platform fixture movable to vibrate in a predetermined plane;
    said platform fixture having a mounting face disposed at a selected angle of incline relative to the plane of vibration; and
    mounting means on said platform mounting face, for pivotally mounting a specimen thereon, said means disposed orienting the orthogonals of a mounted specimen relative to the plane of vibration such as to select an angle of incline for the platform face thereto such that said specimen, without dismounting, can be pivotally turned through selected angular increments of 120° exposing successive sets of orthogonals to vibration.

2. The apparatus as in claim 1, wherein said mounting means comprises:
    a mounting fixture having mounting faces disposed to form the sides of an equilateral pyramid orthogonal at its apex;
    said pyramidal formulated fixture pivotally mounted on said platform face on an axis as from said apex perpendicular to the platform face; and
    said mounting fixture having a mounting face disposed in a plane perpendicular to the plane of vibration of the platform fixture, such that the base of said mounting fixture lying in the plane of the mounting face of the platform fixture selects an angle of incline therefor relative to the vibration plane such that, with a test specimen mounted on said mounting face of the mounting fixture with its major orthogonals parallel to the orthogonal legs of the mounting fixture, when said fixture is turned through angular increments of 120° about its axis, with the specimen so affixed, each of the major orthogonals of the specimen will be successively exposed to vibration.

3. The apparatus in claim 1 wherein, in combination with said mounting means:
    the selected angle of incline of the platform mounting face relative to the plane of vibration is equivalent to the angle at the base of an equilateral pyramid, having legs orthogonal at its apex, taken at the vertex of the intersection of two base lines, between one of the intersecting legs of the pyramid thereat and a line drawn from said vertex to the midpoint of the opposite base line.

4. The apparatus as in claim 3 wherein said mounting means comprises an axis mounting, perpendicular to said platform mounting face, with the specimen directly mounted thereon along one of its major orthogonals, such that said specimen, without dismounting, pivotally turned through selected angular increments of 120°, will expose successive sets of other orthogonals to vibration.

5. An apparatus as in claim 1, wherein said shaker platform fixture is substantially wedge-shaped in configuration with the face thereof comprising the platform mounting face.

6. An apparatus as in claim 5, wherein the angle of inclination of said platform fixture mounting face relative to the plane of vibration thereof is 35° 16′.

7. An apparatus as in claim 1, wherein said platform fixture and mounting fixture comprise:
    the truncated components of a half cube cut from a cube by a vertical plane through one of its diagonals;
    said components of the half cube resultant from a plane passed coaxially through said former diagonal downwardly through the lower base vertex opposite said diagonal;
    said resultant upper component being a mounting fixture in the form of an equilateral pyramid orthogonal at its apex mounted on the lower component forming the platform fixture on the inclined angular mounting face thereof along an axis from the apex of said pyramid perpendicular to said platform face; and
    said mounting fixture having a mounting face perpendicular to a vertical plane of vibration such that a specimen mounted thereon with all of its major orthogonals parallel to the orthogonals of the legs forming the apex of said pyramid will, when turned on the axis of said mounting fixture through angular increments of 120°, expose all of said major orthogonals to vertical vibration.

8. An apparatus as in claim 5 wherein the angle of inclination of said wedge shaped fixture relative to a horizontal plane of vibration is equal to that angle, taken at the base vertex of an equilateral pyramid, orthogonal at its apex, subtended by a line from said vertex to the midpoint of the opposite base line and a line from said vertex forming one of the legs of said pyramid.

* * * * *